United States Patent Office 3,234,658
Patented Feb. 15, 1966

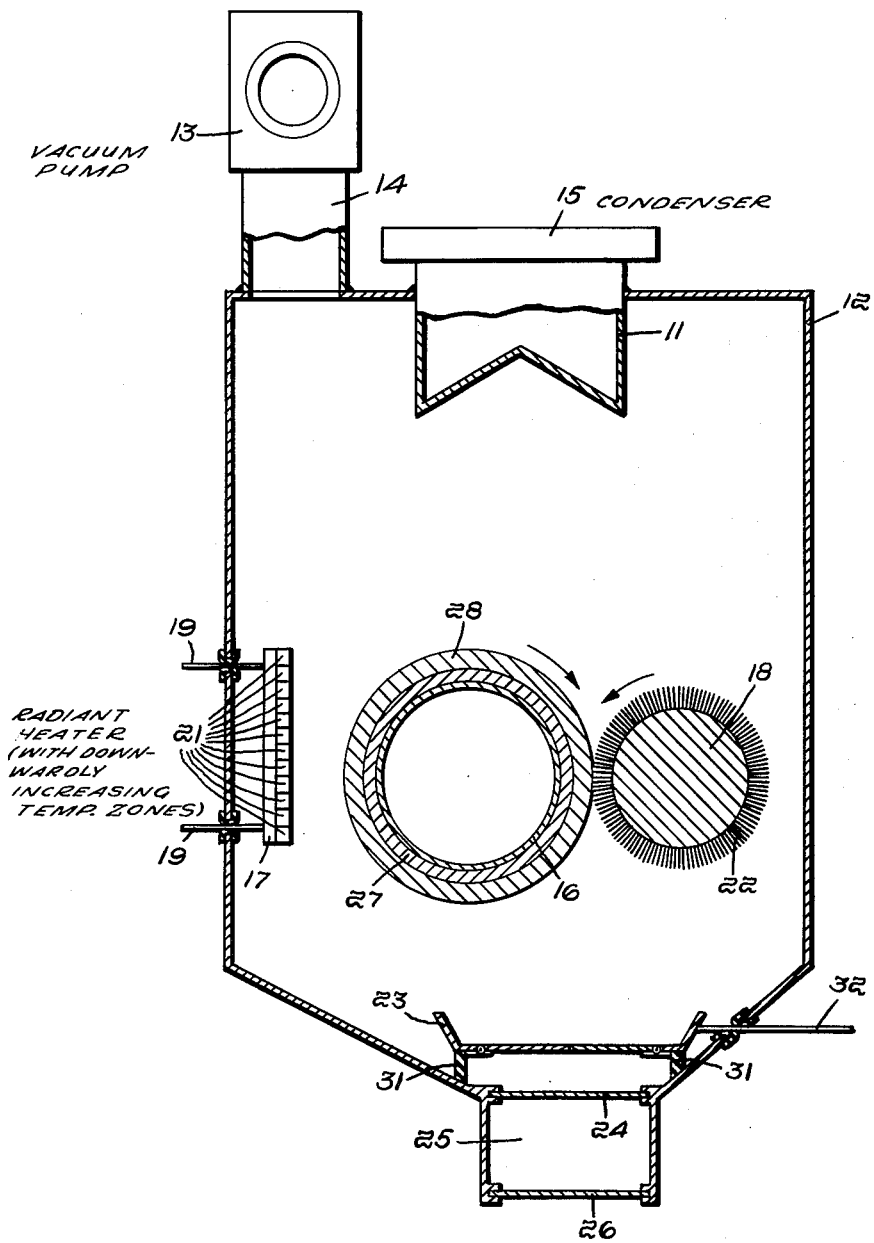

3,234,658
FREEZE DRYING METHOD AND APPARATUS
Ulrich Hackenberg, Alter Trassweg 9, Bensberg-Refrath, Germany
Filed Feb. 26, 1963, Ser. No. 260,989
Claims priority, application Germany, Feb. 27, 1962, L 41,336
13 Claims. (Cl. 34—5)

In freeze-drying, frozen substances are put in a dry state through sublimation of the ice. In this process, e.g., delicate foodstuffs of vegetable or animal origin, including juices and extracts, are conserved by carefully changing them into dry form.

In order to facilitate the removal of the steam at the low hydrostatic pressures and pressure differences of freeze-drying, the drying is accomplished in a vacuum with a simultaneous heating. After the frozen material has been placed in a vacuum container which is connected with a deep-frozen condensation surface, the ice present in the material is sublimated off under vacuum, and the drying process continues from the outer surfaces of the material toward the inside.

Starting from the edge of the material, a dry layer remains from the steadily diminishing ice core. This dry layer delimits the drying speed by decreasing the energy flow to the ice (that is, the supply of heat which is to be furnished the sublimation surface as sublimation heat) and the mass flow away from the ice (which is the flow of water vapor directed from the ice surface to the surface of the material).

In addition, this dry surface layer is much more susceptible to heat damage than is the ice core. Therefore the maximum heat input must be reduced to prevent thermal damage of the dry surface layer. Such a heat reduction further reduces the efficiency of the drying process.

It is therefore the object of this invention to provide a freeze-drying method and apparatus which reduces drying time, increases heat utilization efficiency and prevents damage to the freeze-dried product caused by application of excessive heat.

One feature of this invention is the provision of a freeze-drying installation which during the freeze-drying process continually removes an external fully dried layer portion of the frozen product core.

Another feature of this invention is the provision of a freeze-drying installation of the above featured type wherein the frozen food product moves during the drying process from an area subject to sublimation heating to an area of dry external layer removal which is substantially removed from the effects of the sublimation heating.

Another feature of this invention is the provision of a freeze-drying installation of the above featured type wherein the movement of the frozen product takes place upon a rotatable cylindrical core diametrically straddled by a heat source and a scraping device adapted to remove the external layer of the rotatable product core.

Another feature of this invention is the provision in a freeze-drying installation of the above featured type including apparatus specifically adapted to project the dried product material in a direction away from the pumping and heating components of the freeze-drying installation.

Another feature of this invention is the provision of a freeze-drying installation of the above featured types arranged so that gravity provides the force projecting the dried removed product material in a direction away from the pumping and heating components.

Another feature of this invention is the provision of a freeze-drying installation of the above featured type which includes an electro-static field for compelling the removed dried product material in a direction away from the pumping and heating components.

Another feature of this invention is the provision of a freeze-drying installation of the above featured type in which the scraping device is a cylinder in parallel tangential contact with the frozen product cylinder and adapted for rotation in an opposite direction thereto thereby providing at the line of contact a tangential force compelling the dried removed product material in a direction away from the pumping and heating components.

Another feature of this invention is the provision in a freeze-drying installation of a heat source divided into a plurality of different temperature zones and a frozen product conveyer device adapted to sequentially move the drying product through the different temperature zones.

These and other features and advantages of the present invention will become more apparent upon a perusal of the following specifications taken in conjunction with the accompanying drawing which is a schematic cross section showing of a preferred embodiment of the subject invention.

Referring now to FIG. 1 there is shown a water vapor condenser 11 positioned in the upper portion of the freeze-drying vacuum chamber 12. The vacuum pump device 13 for evacuating the vacuum chamber 12 is connected to the top wall thereof by the exhaust tubulation 14 while the refrigeration unit 15 is adapted to provide cooling for the water vapor condenser 11.

Positioned within the vacuum chamber 12 and below the water vapor condenser 11 is the cylindrical material drum 16 composed of, for example, a suitable metal and adapted for clockwise rotation. Diametrically straddling the cylindrical material drum 16 in a horizontal plane are the radiant heat source 17 and the dried product removal device 18. Passing through and electrically insulated from the vacuum chamber 12 is a pair of electrical feed-throughs 19 which provide electrical energization for the radiant heat source 17. A plurality of heat zones 21 are adapted to provide progressively lower temperature heat source areas from bottom to top in the radiant heat source 17. The scraping device 18 is adapted for counter clockwise rotation and is biased for linear movement in the horizontal plane toward the material drum 16 so as to provide parallel tangential contact therewith. The cylindrical surface of the scraping device 18 is provided with a brush-like covering 22 adapted to provide a product layer removal action as described below.

Positioned below the line of tangential contact between scraping device 18 and cylindrical material drum 16 is the dried product receptacle device 23. Below the receptacle 23 in the wall of vacuum chamber 12 is a vacuum valve 24 which opens an airlock chamber 25. The bottom portion of airlock chamber 25 is formed by a second vacuum valve device 26 which opens to atmosphere.

In the operation of this device the cylindrical surface of material drum 16 is provided with an inner ice layer 27 and an outer frozen core 28 composed of a layer of the material to be freeze-dried. These frozen layers can be applied with the material drum 16 positioned either within the vacuum chamber 12 or while it is removed therefrom. Then with the vacuum chamber pressure reduced by the vacuum pump device 13, the water vapor condenser 11 cooled by the refrigeration device 15, and the plural zoned radiant heat source 17 energized via feed-throughs 19 the frozen material covered drum 16 and scraping device 18 are energized to provide rotation thereof.

As a given exterior segment of the frozen material core 28 passes by the radiant heat source 21 its water content will be removed by sublimation. The water vapor resulting therefrom will move upward in the chamber 12 in response to the pressure gradiant created by the water vapor condenser 11 and vacuum pump device 13. However, upon reaching the scraping device 18 the surface temperature of the material core 28 will have decreased to approximately the equilibrium temperature appropriate to the steam pressure in the vacuum chamber 12. Therefore during the scraping operation there is produced little or no water vapor which would carry the dry loosened product toward the pumping components 11 and 13.

Upon contact with the scraping device 18 the external dry product layer on the material care 28 will be removed by the brush-like covering 22. As a result of the counter rotational directions of the material drum 16 and the scraping cylinder device 18 (which is preferably adapted for faster rotation than the product core 16) the dry loosened product particles will be compelled downward tangentially to the product core 16 and scraping device 18 and into the product receptacle 23.

After the product receptacle 23 has been filled in this way it can be automatically emptied through the opened valve 24 into the airlock chamber 25. The upper vacuum valve 24 will then again be closed to maintain vacuum within the vacuum chamber 12 and the vacuum valve 26 opened to allow removal of the dried product from the airlock chamber 25.

The purpose of the ice layer 27 in this operation is to prevent damage to the material drum 16 by the scraping device 18 upon removal of the entire frozen material layer 28.

To provide a greater compelling force for the detached product particles the product receptacle 23 can be insulated from the vacuum chamber 12 by insulating supports 31 and electrically energized via an electrical feedthrough 32 which passes through and is insulated from the wall of the vacuum chamber 12. The electric field produced thereby will provide an attractive force on the neutrally charged product particles toward the energized product receptacle 23.

The removal of the dried surface layer on the material core 28 continually exposes a new frozen surface to the applied drying heat. The problems of inefficient heating, heat damage and water vapor flow restriction described above are substantially eliminated. Furthermore the fact that the drying material surface is moving by the heat source allows for much more uniformity in the heating of localized surface areas.

Proper heating is further enhanced by the provision of the decreasing temperature zones 21. The frozen surface which has been freshly exposed by the scraping device 18 initially moves into the first zone of radiant heating device 17 which has been adjusted for maximum permissible heat input. As the dry layer begins to form on the product surface, this maximum permissible temperature is reduced because of the lower heat capacity of the dried surface layer. However, as this dry layer is forming it will be passing with the rotating material drum 16 into zones of properly selected lower temperatures.

The preferred embodiment described above also provides the very desirable function of preventing the detached dried material from being carried along in very fine diffusion with the sublimating water vapor. Such an occurrence would result in an undesirable loss of freeze-dried product in addition to harmful contamination of the pumping device 13, water vapor condenser 11 and radiant heat source 17. This advantage is provided by scraping the dried material on a side of the rotating material drum 16 opposite to the heat source 17 and water vapor condenser 11 and by arranging these units so that the gravitational force compels the detached product particle in a direction away from these devices. This result is enhanced by the similarly directed forces produced by the oppositely rotating material drum 16 and the scraping device 18 and by the electric field provided by the energization of the product receptacle.

Obviously many modifications and variations of the present invention are possible in light of the above teachings. It is therefore to be understood that within the scope of the appended claims, the invention may be practiced otherwise than as specifically described.

What is claimed is:

1. A freeze-drying apparatus comprising a vacuum chamber, evacuation means adapted for gas communication with said vacuum chamber to allow evacuation thereof, heating means adapted to provide in said vacuum chamber an area in which sublimation heat is applied to a frozen material core of sufficient thickness that successive layers can be removed for drying thereof, condensation means adapted to condense the sublimating water vapors of the frozen material core, and removal means adapted to remove successive external dried layers of the frozen material core during the freeze-drying process.

2. The apparatus according to claim 1 including conveyor means adapted to produce movement of the frozen material core during the freeze-drying process and wherein said heating means is adapted to provide a plurality of different temperature heating zones within said vacuum chamber.

3. The apparatus according to claim 1 including conveyer means adapted to produce movement of the frozen material core during the freeze-drying process, and wherein said removal means is adapted to provide removal of successive dried external product layers in a part of said vacuum chamber removed from the area in which sublimation heat is applied.

4. The apparatus according to claim 1 including conveyor means adapted to produce movement of the frozen material core during the freeze-drying process, said conveyor means being an axially rotatable cylinder having a surface adapted to support an annular layer of the frozen material, and wherein said removal means is adapted to contact the rotating layer of the frozen material on said rotatable cylinder so as to produce removal of successive external dried layers of the frozen material.

5. The apparatus according to claim 4 wherein said removal means is adapted to provide removal of the dried external layers in a part of said vacuum chamber removed from the area in which sublimation heat is applied.

6. The apparatus according to claim 4 arranged wherein the force of gravity at the point of dry material removal is in a direction away from said condenser, evacuation and heating means.

7. The apparatus according to claim 6 wherein said removal means is an axially rotatable cylinder, said removal means is adapted for rotation in a direction opposite to that of said conveyor cylinder means and for parallel tangential contact therewith so as to produce removal of the external dried material layers, and wherein said removal means is further adapted to provide a parallel tangential contact with the material layers which induces a compelling force on the removed dry product in a direction away from said condenser, evacuation and heating means.

8. The apparatus according to claim 4 including means for producing an electrostatic field in said vacuum chamber, and wherein said electrostatic field is directed so as to produce a force on the particles of the removed dry material layers in a direction away from said condenser, evacuation and heating means.

9. The apparatus according to claim 4 wherein said removal means is an axially rotatable cylinder, said removal means is adapted for rotation in a direction opposite to that of said conveyor cylinder means and for parallel tangential contact with the material layer thereon so as to produce removal of the successive external dried product layers, and wherein said removal means is further adapted to provide a parallel tangential contact with the material layer on said conveyor means which induces a compelling force on the detached dry material in a direction away from said condenser, evacuation and heating means.

10. The apparatus according to claim 9 wherein said heating means is adapted to provide a plurality of different temperature heating zones within said vacuum chamber.

11. The apparatus according to claim 10 including a material receptacle positioned in said vacuum chamber and adapted to receive the detached dry material layers, and an airlock chamber associated with said vacuum chamber and adapted to receive the detached dry material layers contained in said product receptacle.

12. A freeze-drying process for the type of freeze-drying installation having evacuating, condenser, heater, and vacuum chamber means comprising the steps of, evacuating the vacuum chamber, positioning a frozen material core in the vacuum chamber, moving said frozen material core through a heat zone wherein sublimation inducing heat is applied to said frozen material core so as to dry an external layer thereof conveying said dried external layer out of the heating zone, removing the external dried layer from said frozen material core so as to expose a new surface thereof, and moving said newly exposed surface of said frozen core through said heat zone so as to apply sublimation inducing heat to the newly exposed surface of the frozen material core.

13. A freeze-drying process for the type of freeze-drying installation having evacuating, condenser, heater and vacuum chamber means comprising the steps of evacuating the vacuum chamber, positioning a frozen material core in the vacuum chamber, conveying the frozen material core through a heating zone in which heat is applied to produce sublimation and drying of an external layer of the frozen material core, conveying the frozen material core out of the heating zone, removing the dry external layer from the frozen material core to expose a new surface thereof, providing a force on the removed external layer in a direction away from the evacuating and condenser components of the freeze-drying installation, and conveying the newly exposed surface of the frozen material core through the heating zone.

References Cited by the Examiner

UNITED STATES PATENTS

| | | | |
|---|---|---|---|
| 1,054,765 | 3/1913 | Harris et al. | 34—85 |
| 1,079,669 | 11/1913 | Seltmann. | |
| 1,250,427 | 12/1917 | Campbell | 34—85 |
| 2,528,476 | 10/1950 | Roos et al. | 34—5 |
| 2,533,125 | 12/1950 | Levinson et al. | 34—5 |
| 2,751,687 | 6/1956 | Colton | 34—5 |

ROBERT A. O'LEARY, *Primary Examiner.*

NORMAN YUDKOFF, *Examiner.*